MIN DE LIN McGERRY.
HEATING AND VENTILATING SYSTEM FOR CARS AND APARTMENTS.
APPLICATION FILED OCT. 10, 1908.
986,731.
Patented Mar. 14, 1911.
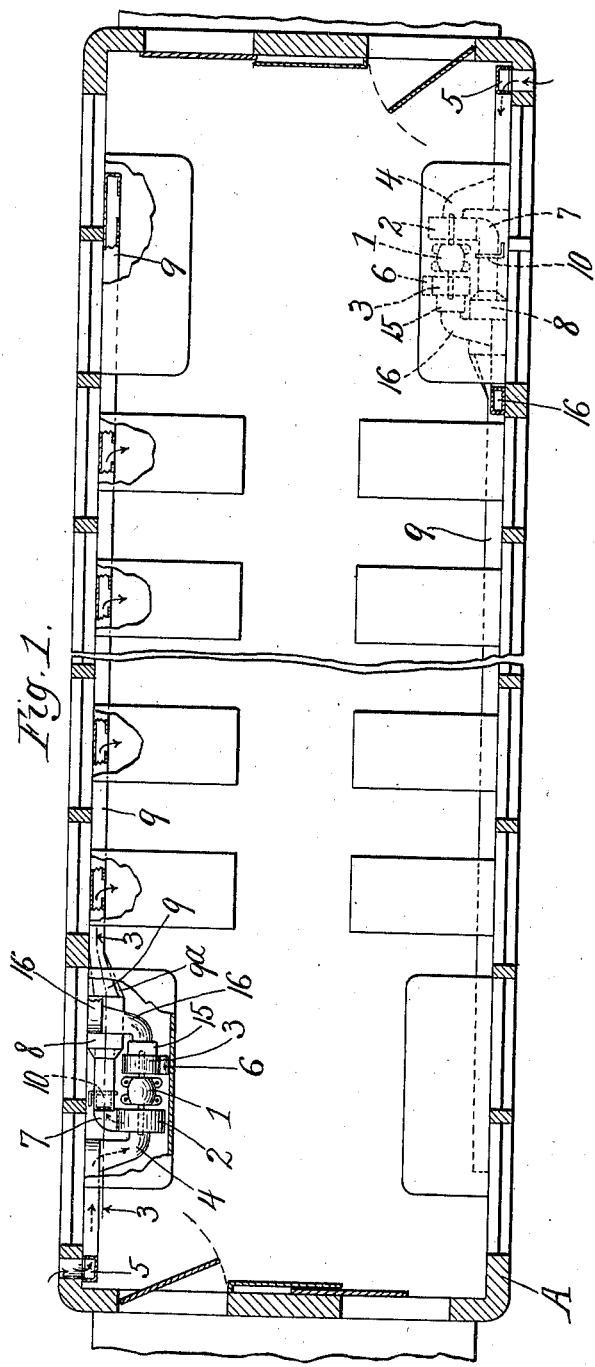

MIN DE LIN McGERRY.
HEATING AND VENTILATING SYSTEM FOR CARS AND APARTMENTS.
APPLICATION FILED OCT. 10, 1908.
986,731.
Patented Mar. 14, 1911.
2 SHEETS—SHEET 2.
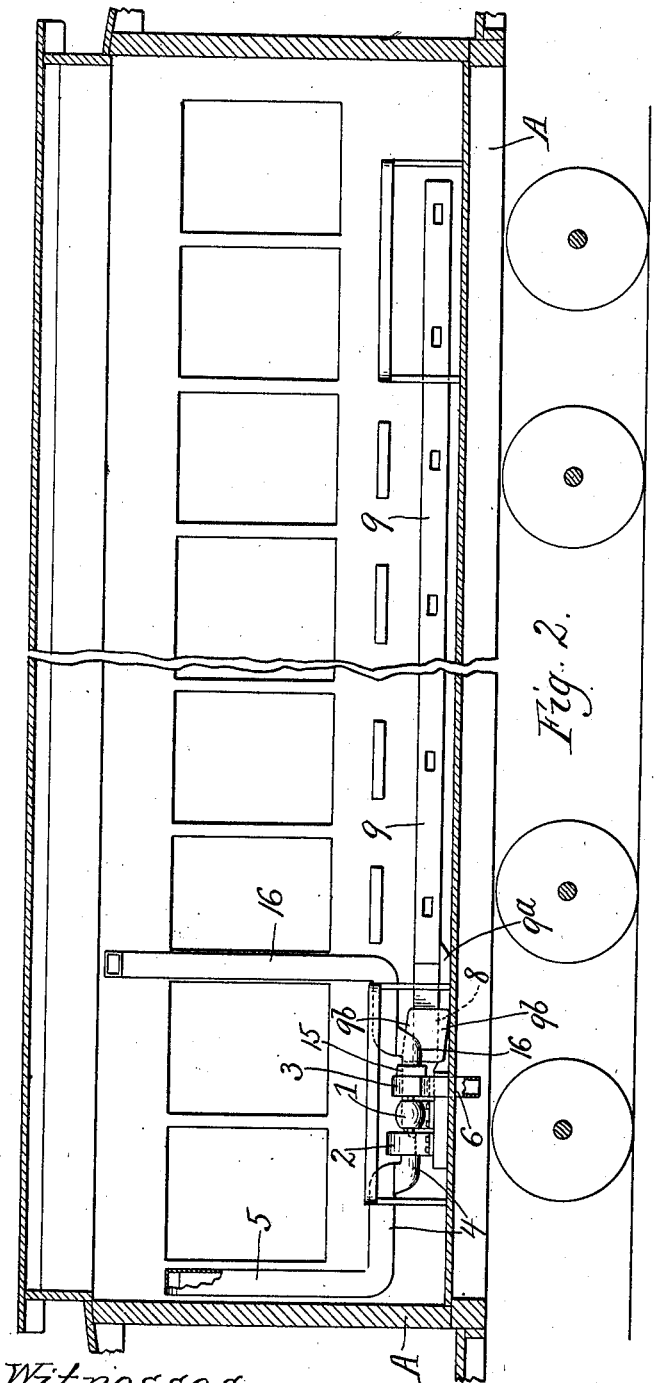
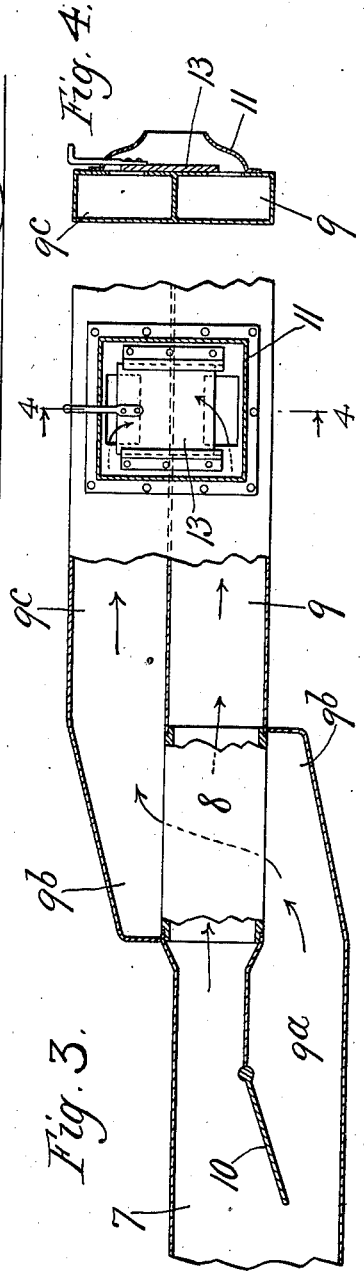

UNITED STATES PATENT OFFICE.

MIN DE LIN McGERRY, OF GRAND RAPIDS, MICHIGAN, ASSIGNOR, BY MESNE ASSIGNMENTS, TO FRANK P. MIES, OF CHICAGO, ILLINOIS.

HEATING AND VENTILATING SYSTEM FOR CARS AND APARTMENTS.

986,731.

Specification of Letters Patent. Patented Mar. 14, 1911.

Application filed October 10, 1908. Serial No. 457,063.

*To all whom it may concern:*

Be it known that I, MIN DE LIN McGERRY, a citizen of the United States, residing at Grand Rapids, in the county of Kent and State of Michigan, have invented new and useful Improvements in Heating and Ventilating Systems for Cars and Apartments, of which the following is a specification, reference being had to the accompanying drawings, forming a part thereof.

The purpose of this invention is to provide an improved system for simultaneously heating and ventilating an apartment, and particularly, an apartment such as a railway car, some features of the invention being especially adapted for use in a long and relatively narrow apartment.

It consists of the elements and features of construction and their arrangement for co-operation which are herein described and shown as indicated in the claims.

In the drawings:—Figure 1 is a horizontal sectional view of a car showing a plan view of the devices constituting the present invention. Fig. 2 is a vertical longitudinal section of the car showing the devices in elevation. Fig. 3 is a central longitudinal section; and Fig. 4 is a section on line 4—4 of Fig. 3.

In a long and relatively narrow apartment, such as a car, A, shown in the drawings, there is located preferably near one corner an organization comprising an electric motor, 1, having associated with it two fans, 2 and 3, at opposite sides of the motor respectively, and having their rotary members mounted on the motor shaft. The intake of the fan, 2, is the pipe, 4, which leads from a vertical duct, 5, located in the corner of the car or apartment and communicating at its upper end with the outer air. The discharge of the fan, 3, is connected with an exhaust pipe, 6, which leads downward and out through the floor of the car, discharging underneath the same. The air may enter the intake of the fan freely from the apartment, the fan being preferably located and having its immediate intake near the floor, but if it is desired to take the air from a higher point, there will be provided about the intake an intake chamber, 15, into which a pipe, 16, may lead from the level and position in other respects from which it is judged best to take the air; that is, the level and position at which it is judged the foul air will be found. This may vary with the conditions of weather and occupancy of the car, being affected also by the illuminating means, whether gas or electric light. The discharge from the fan, 2, leads by way of the pipe, 7, to the heater, 8, and the discharge from the heater leads through a conduit, 9, along the side of the car on which the organization described is located, being preferably provided with openings under each seat for discharge of the heated air into the car at as many points as such openings are provided. By this organization, the air is drawn in from the outside of the car, passed through the heater and delivered at proper temperature at distributed points throughout the length of the car, and the foul air is drawn back by the fan, 3, from the points at which such foul air most accumulates, and discharged from the car through the bottom at a point where it is as little as possible liable to be returned into the car through the intake.

Preferably, the apparatus described is duplicated in each car, another complete set of elements described,—viz., motor, two fans, and heater, with their respective intake and discharge connections,—being located at the diagonally opposite corner of the car from that at which the first set described is located, so that whatever loss of heat may be experienced by the air current in passing from the heater through the length of the conduit, 9, which would cause it to be discharged at the more remote openings under the sides than at nearer opening, is offset by the opposite arrangement of the similar system on the opposite side of the car, because opposite each discharge opening of either conduit near one end of the car from which the air emerging is at a higher temperature, there is a corresponding opening of the opposite conduit from which the air is emerging at a lower temperature; and at the middle of the length of the car, the openings being equally distant from their respective heaters, the air will emerge substantially at the same temperature intermediate such higher and lower temperatures.

The heater, 8, may be of the general construction shown in my application Serial No. 419,143, filed March 4, 1908, the particular construction of which need not be described for the purpose of the present application.

For heating and ventilating a car which is not subdivided into compartments, preferably the discharge from the fan, 2, is divided, a portion of the air passing the heater by way of a by-pass, 9ª, and entering the conduit, 9, beyond the heater, so that the air delivered from that conduit at the several points of discharge therefrom located under the several seats or otherwise at different points of the length of the car or apartment is partly made up of air heated by the heater and partly of air not so heated. A regulating valve or deflector, 10, is then located at the point at which the conduit, 9ª, branches off from the pipe, 7, which may be adjusted to vary the proportion of the air discharged from the fan which passes by the two courses respectively,—that is, through the heater and through the by-pass. This adapts the device to be easily regulated so as to furnish the required quantity of air for ventilation in view of the number of persons occupying the car or apartment, and also to furnish the air at the required temperature in view of the weather conditions. The heater should in any event be insulated,—that is, partly protected, not only against undue radiation of heat directly into the compartment, but also against danger of communicating excessive heat to the adjacent walls and furniture,—and the by-pass, 9ª, affords a convenient and very efficient means for such insulation, comprising an air jacket, 9ᵇ, around the heater. Obviously the by-pass may be extended past the heater otherwise than by being expanded into the form of such air jacket.

For heating and ventilating compartment cars,—that is, those in which the seated space of the car is divided into compartments inclosed from each other so as to be separately heated and ventilated,—it is desirable to adapt the apparatus to independent regulation of the temperature and ventilation of each compartment according to the needs of the occupant; and for this purpose the conduit, 9ª, instead of leading into the conduit, 9, immediately beyond the heater may be extended parallel therewith, as shown in Figs. 4 and 5, wherein such extension is denoted by the reference character, 9ᶜ; and at each compartment the openings from the two conduits, 9 and 9ᶜ, being immediately adjacent, are inclosed in a hood, 11, from which the air derived from both the conduits is discharged into the compartment, a slide valve, 13, being mounted so as to be adjusted to cover part of each opening or to cover the whole of one opening, leaving the other entirely uncovered. In this arrangement, preferably the conduit, 9, leading from the heater is located below the conduit, 9ᶜ, which delivers the unheated air, so that the tendency of the heated air to rise and of the cooler air to fall causes the two currents to be intermingled in the hood and to be discharged therefrom at an average temperature.

Preferably, for certain purposes, the fan, 2, which delivers air into the car, is made of greater capacity than the fan, 3, which withdraws the air therefrom, the advantage of this relation being that thereby there is maintained in the car a slight pressure of air which will cause it to pass out through all crevices and open windows, thus counteracting the tendency usually noticeable of the air to enter from the outside, carrying in dust and cinders. This also tends to prevent the entrance of cold air through all crevices, and causes not only the condition but the temperature of the air in the car to be most perfectly under the control of the ventilating and heating apparatus.

In some situations, it may be found advantageous to provide for local control of the temperature of the several compartments of a compartment car by a local heater at each compartment, such local heater being in that case situated at the discharge mouth of the air conduit leading to the compartment and provided with customary regulating devices. When this is done, it will not usually be desirable to provide both the hot and the cold air conduit leading to the compartments, the regulation of the heater accomplishing the result which is accomplished by the adjustment of the damper when the two conduits are employed as above described.

I claim:—

1. In a system of the character described, the combination with an apartment to be heated and ventilated, of two fans, each in independent compartments larger in diameter than the respective pipes communicating therewith, a means for rotating said fans, an intake pipe leading from outside of said apartment to one of said fan compartments, a heater through which air is driven by the associated fan, a duplex distributing pipe extending from said fan comprising two branches, one leading through said heater and both provided with apertures for distributing cool and warm air, a foul air pipe leading from the interior of the apartment to the other fan compartment, and a discharge pipe directly connecting said fan compartment with the outside of said apartment for discharging the foul air.

2. In a system of the character described, the combination with a car to be heated and ventilated, of two rotary fans in separate independent compartments, means, independent of the motion of the car for driving said fans, an intake pipe for one of the fans and a discharge pipe for the other leading respectively to and from the fans from and to the exterior air, through which fresh air is driven by one of the fans and a duplex conduit comprising two pipes connected with the discharge opening of the compartment containing said fan one of said pipes including said heater, both pipes extending through said car and each provided with discharge openings distributed along its length, and an intake pipe for discharging the foul air of the car connected with the intake opening of the compartment containing the other fan.

3. A system for heating and ventilating cars and apartments comprising a fan, an intake pipe therefor leading from the exterior; a heater and a conduit connected with the discharge thereof extending through the apartment provided with discharge openings distributed along its length; a discharge pipe from the fan having one branch leading to the heater and another branch connected for discharge at intervals along the length of the discharge pipe from the heater.

4. A heating and ventilating system for cars and apartments consisting of a fan motor, two fans driven thereby; an intake pipe for one of the fans and a discharge pipe for the other leading respectively to and from the fans from and to the exterior air; a heater and a conduit connected with the discharge thereof extending through the apartment and provided with discharge openings distributed along its length, and a discharge conduit from the fan whose intake is connected with the outer air, such discharge conduit being divided, one branch leading to the heater and the other branch being connected for discharge at intervals along the length of the conduit leading from the heater.

5. A system for heating and ventilating cars and apartments comprising a fan, an intake pipe therefor leading from the exterior; a heater; a discharge pipe from the heater extending through the apartment and provided with discharge openings distributed along its length; a discharge pipe from the fan leading to the heater; a branch of said discharge pipe taking off therefrom intermediate the fan and the heater; an air jacket around the heater to which said branch pipe leads, and a discharge pipe from said air jacket connected for discharge at intervals along the length of the discharge conduit from the heater.

6. A system for heating and ventilating cars comprising a fan, an intake pipe for the same leading from the exterior; a heater and a discharge pipe therefrom extending through the apartment and provided with discharge openings distributed along its length; a discharge pipe from the fan leading to the heater; a branch from such discharge pipe taking off therefrom between the fan and the heater and extending adjacent to the discharge conduit from the heater, and having discharge apertures along its length adjacent to the discharge apertures of said heater discharge conduit, and means for relatively varying the discharge from such adjacent apertures.

Signed at Chicago, Illinois, October 2, 1908.

MIN DE LIN McGERRY.

In the presence of—
J. S. ABBOTT,
M. GERTRUDE ADY.